(12) United States Patent
Pennebaker, III

(10) Patent No.: US 12,529,596 B2
(45) Date of Patent: Jan. 20, 2026

(54) WIRELESS SENSOR WITH EMBEDDED SOLAR PANEL AND INTERIOR LIGHT DETECTOR

(71) Applicant: E. Strode Pennebaker, III, Houston, TX (US)

(72) Inventor: E. Strode Pennebaker, III, Houston, TX (US)

( * ) Notice: Subject to any disclaimer, the term of this patent is extended or adjusted under 35 U.S.C. 154(b) by 146 days.

(21) Appl. No.: 18/460,002

(22) Filed: Sep. 1, 2023

(65) Prior Publication Data

US 2025/0076112 A1 Mar. 6, 2025

(51) Int. Cl.
*G01J 1/44* (2006.01)
*H02S 40/22* (2014.01)
(Continued)

(52) U.S. Cl.
CPC ............... *G01J 1/44* (2013.01); *H02S 40/22* (2014.12); *H02S 50/10* (2014.12); *G01J 2001/4266* (2013.01)

(58) Field of Classification Search
CPC .......... G02B 26/001; G02B 2027/0178; G02B 27/017; G02B 27/0172; G02B 26/02; G02B 2027/014; G02B 26/00; G02B 26/023; G02B 2027/0138; G02B 2027/0187; G02B 6/0036; G02B 27/0093; G02B 6/0065; G02B 2027/0118; G02B 6/0028; G02B 6/0038; G02B 6/0076; G02B 26/0841; G02B 6/00; G02B 6/0068; G02B 26/04; G02B 6/0053; G02B 27/0101; G02B 6/0055; G02B 6/0018; G02B 27/0176; G02B 6/005; G02B 6/006; G02B 26/0833; G02B 5/201; G02B 6/0011; G02B 6/0088; G02B 2027/012; G02B 19/0042; G02B 6/0073; G02B 19/0052; G02B 6/0035; G02B 6/0051; G02B 19/0061; G02B 5/30; G02B 27/01; G02B 6/0083;
(Continued)

(56) References Cited

U.S. PATENT DOCUMENTS

2010/0029268 A1* 2/2010 Myer .................. F21S 2/00
340/521
2011/0265840 A1* 11/2011 Sela .................. H02S 50/10
356/218

(Continued)

FOREIGN PATENT DOCUMENTS

CN 210400457 U * 4/2020
KR 102430785 B1 * 8/2022 ............. H02S 10/00
(Continued)

*Primary Examiner* — Michael P Stafira
(74) *Attorney, Agent, or Firm* — Osha Bergman Watanabe & Burton LLP

(57) ABSTRACT

A wireless sensor comprising an enclosure that houses sensor electronics and wireless communication electronics; a solar panel embedded into the enclosure such that the solar panel forms a first wall of the enclosure; and a light detector disposed in an interior of the enclosure underneath the solar panel. The light detector measures ambient light within the enclosure. The wireless sensor communicates, via the wireless communication electronics, the measured ambient light within the enclosure. The wireless sensor further comprises a plurality of light detectors.

20 Claims, 11 Drawing Sheets

(51) Int. Cl.
*H02S 50/10* (2014.01)
*G01J 1/42* (2006.01)

(58) Field of Classification Search
CPC .... G02B 27/0081; G02B 6/003; G02B 26/08; G02B 6/0031; G02B 2027/0112; G02B 6/002; G02B 27/30; G02B 6/0095; G02B 3/14; G02B 30/27; G02B 6/0001; G02B 2027/0154; G02B 6/0045; G02B 5/32; G02B 6/0016; G02B 6/0075; G02B 2027/0174; G02B 26/005; G02B 27/0179; G02B 6/0085; G02B 27/0916; G02B 27/286; G02B 27/0075; G02B 19/009; G02B 2027/0123; G02B 6/0078; G02B 19/0028; G02B 30/24; G02B 6/0033; G02B 6/0043; G02B 21/06; G02B 21/365; G02B 26/007; G02B 27/0006; G02B 5/0278; G02B 6/0041; G02B 19/0057; G02B 27/4205; G02B 30/10; G02B 27/0018; G02B 5/22; G02B 6/0015; G02B 6/0061; G02B 2027/0159; G02B 26/105; G02B 27/0149; G02B 30/33; G02B 5/20; G02B 2027/0132; G02B 30/31; G02B 30/50; G02B 2027/015; G02B 27/0977; G02B 6/0081; G02B 13/06; G02B 2027/011; G02B 27/4272; G02B 1/002; G02B 1/11; G02B 2027/0107; G02B 30/30; G02B 6/0023; G02B 6/0056; G02B 21/0008; G02B 26/004; G02B 30/28; G02B 5/005; G02B 5/0252; G02B 2027/0127; G02B 5/0215; G02B 6/001; G02B 6/0025; G02B 19/0076; G02B 26/0825; G02B 3/0006; G02B 3/12; G02B 5/285; G02B 6/0026; G02B 2027/0156; G02B 27/0068; G02B 27/0955; G02B 5/18; G02B 5/204; G02B 5/286; G02B 6/009; G02B 6/10; G02B 2027/0143; G02B 27/646; G02B 3/0056; G02B 30/26; G02B 5/3058; G02B 6/0006; G02B 6/0021; G02B 7/12; G02B 1/043; G02B 1/111; G02B 2027/0116; G02B 2027/0125; G02B 26/0816; G02B 27/1066; G02B 5/001; G02B 7/021; G02B 2027/0158; G02B 2027/0185; G02B 25/001; G02B 30/60; G02B 5/003; G02B 1/18; G02B 19/0009; G02B 2207/129; G02B 26/0875; G02B 30/29; G02B 5/1809; G02B 5/3016; G02B 2003/0093; G02B 2027/0134; G02B 27/4277; G02B 3/0081; G02B 3/08; G02B 5/208; G02B 5/26; G02B 5/288; G02B 6/0091; G02B 7/028; G02B 7/28; G02B 7/285; G02B 2027/0141; G02B 2207/115; G02B 27/095; G02B 5/0226; G02B 6/0008; G02B 7/026; G02B 27/00; G02B 27/46; G02B 3/02; G02B 5/10; G02B 5/207; G02B 7/14; G02B 7/36; G02B 13/001; G02B 13/0015; G02B 2207/101; G02B 2207/113; G02B 27/0983; G02B 27/283; G02B 27/288; G02B 27/4261; G02B 30/25; G02B 5/126; G02B 5/1833; G02B 6/0046; G02B 6/0058; G02B 1/113; G02B 2027/0129; G02B 25/004; G02B 26/06; G02B 26/085; G02B 27/0025; G02B 5/0247; G02B 5/24; G02B 6/3522; G02B 7/008; G02B 7/38; G02B 1/06; G02B 13/18; G02B 23/14; G02B 27/0103; G02B 27/1013; G02B 27/281; G02B 3/00; G02B 3/005; G02B 5/08; G02B 5/124; G02B 5/1819; G02B 5/28; G02B 6/0013; G02B 6/04; G02B 6/08; G02B 7/02; G02B 7/183; G02B 1/12; G02B 15/10; G02B 17/026; G02B 2027/0147; G02B 2027/0183; G02B 23/00; G02B 23/04; G02B 23/10; G02B 23/145; G02B 26/0808; G02B 27/0189; G02B 27/0927; G02B 30/36; G02B 5/1861; G02B 6/3688; G02B 6/4213; G02B 7/023; G02B 7/04; G01J 1/4204; G01J 2001/4266; G01J 1/4228; G01J 1/0219; G01J 1/429; G01J 1/0411; G01J 2005/0077; G01J 3/2803; G01J 1/0271; G01J 1/0403; G01J 1/0247; G01J 1/0238; G01J 1/42; G01J 3/0208; G01J 3/0272; G01J 1/0437; G01J 1/44; G01J 3/26; G01J 3/0205; G01J 3/0216; G01J 1/32; G01J 2003/1234; G01J 1/0488; G01J 5/10; G01J 5/20; G01J 1/0228; G01J 3/10; G01J 5/02; G01J 3/0262; G01J 5/0025; G01J 2001/0257; G01J 3/443; G01J 1/06; G01J 3/42; G01J 3/36; G01J 5/0014; G01J 5/04; G01J 1/00; G01J 1/0422; G01J 1/0433; G01J 1/0474; G01J 2003/1213; G01J 3/021; G01J 3/0256; G01J 5/00; G01J 1/0492; G01J 2001/0481; G01J 2001/061; G01J 2003/2806; G01J 3/0202; G01J 3/0291; G01J 3/505; G01J 4/04; G01J 3/513; G01J 5/0806; G01J 3/02; G01J 3/0229; G01J 1/0214; G01J 1/0266; G01J 2001/4247; G01J 3/28; G01J 5/0022; G01J 5/0265; G01J 5/80; G01J 2003/1282; G01J 2003/283; G01J 3/0289; G01J 3/4412; G01J 3/51; G01J 5/025; G01J 5/0816; G01J 5/0831; G01J 5/59; G01J 3/0218; G01J 3/18; G01J 5/0804; G01J 5/0878; G01J 5/0887; G01J 1/4257; G01J 2003/2826; G01J 2009/0261; G01J 3/0278; G01J 3/14; G01J 3/2823; G01J 3/447; G01J 3/45; G01J 3/4531; G01J 3/4537; G01J 3/46; G01J 3/50; G01J 5/07; G01J 5/0818; G01J 5/602; G01J 9/02; G01J 1/02; G01J 5/007; G01J 5/06; G01J 5/061; G01J 5/064; G01J 5/804; G01J 1/029; G01J 1/18; G01J 3/0264; G01J 4/02; G01J 5/0859; G01J 5/53; G01J 5/60; G01J 2001/4276; G01J 2003/2869; G01J 2003/421; G01J 3/0297; G01J 3/465; G01J 3/524; G01J 5/0205; G01J 5/0275; G01J 5/0893; G01J 5/0896; G01J 1/0204; G01J 1/0233; G01J 1/4214; G01J 1/46; G01J 2001/4285; G01J 2001/446; G01J 2003/2866; G01J 3/024; G01J 5/028; G01J 5/12; H02S 40/38; H02S 99/00; H02S 40/22; H02S 20/30; H02S 50/00; H02S 10/40; H02S 20/32; H02S 50/10; H02S 30/10; H02S 20/10; H02S 30/20; H02S 20/26; H02S 40/32; H02S 20/23; H02S 30/00; H02S 50/15;

H02S 40/30; H02S 40/425; H02S 40/34;
H02S 10/10; H02S 20/20; H02S 40/10;
H02S 10/12; H02S 10/20; H02S 20/00;
H02S 40/44; H02S 40/20; H02S 10/00;
H02S 20/25; H02S 20/22; H02S 40/12;
H02S 40/36; H02S 40/42

See application file for complete search history.

(56) References Cited

U.S. PATENT DOCUMENTS

2012/0293472 A1* 11/2012 Wong .................... G01J 1/4204
250/208.6
2019/0312548 A1* 10/2019 Fernandez .............. H02S 50/00

FOREIGN PATENT DOCUMENTS

WO     WO-2010057138 A2 *   5/2010    ............... F21S 2/00
WO     WO-2021155012 A1 *   8/2021    ............... G01J 5/00

* cited by examiner

WIRELESS SENSOR WITH EMBEDDED SOLAR PANEL AND INTERIOR LIGHT DETECTOR

BACKGROUND

In the field of stationary asset monitoring, networks of wireless sensors are often used to monitor the status of sets of stationary assets co-located at one or more sites. For example, sensors that are part of an industrial site sensing network can monitor one or more conditions associated with equipment deployed in an industrial complex. For example, the data originates from a collection of wireless/wired sensors that may be monitoring stationary assets, e.g., tanks, piping systems, processing systems, fluid and gas systems, and electrical systems. Additionally, there may be environmental sensors for monitoring items such as temperature, pressure, humidity, and the like at various locations across the sites.

Various sensors may be deployed in order to monitor any number of remote assets. For example, known sensor types include fluid level detectors that are often deployed for monitoring the amount of liquids within holding tanks. In many situations, determination of fluid level inside of a vessel is accomplished by installing a sensor device inside the vessel with wiring connected to a collection point outside of the vessel from which the data are often forwarded to a local or remote monitoring system. The sensors can be based on many phenomena, such as position of floats on top of the fluid level interface(s), measurement of fluid pressure which can be converted to level height, ultrasonic travel time measurement to the fluid level, microwave, optical travel time sensors or time delay reflectometry techniques. In addition, flow meters are commonly deployed on pipelines and compressor monitors are deployed to monitor the status and health of compressors. In addition, various sensors can be deployed on oil and gas wells for monitoring tubing, casing, or surface flowline pressure or to monitor and control valves.

Typically, for field health and data notifications, daily updates are generally acceptable. Oilfield custom is to provide a 6:00 AM, report to engineers and supervisors when they arrive in the office. For a non-automated location, a simple 24-hour summary of production and current system status (pressure, tank levels) is normally sufficient. Even for typical automated onshore locations it is unusual to expect a morning report of provide more than hourly data.

Likewise, for site monitoring in the agriculture industry, stationary assets, such as water or fuel tanks may be remotely monitored and configured to alert service personnel when refill becomes necessary. Furthermore, geofences, or the like, may be continuously monitored to alert supervisors of the presence of trespassers, and/or field personnel.

Fields that include a large number and diversity of stationary assets may be distributed over vast tracts of land and are often distributed in extremely dangerous or inhospitable environments. Thus, modern asset monitoring networks deploy complex and costly wireless sensors and/or SCADA control elements that may be integrated into a wide area networks (WANs) or even the internet/worldwide web. Often, due to the complexity of these systems highly-trained service personnel are needed for installation, diagnosis, and repair of the on-site sensors and power systems. Furthermore, present systems require bulky and cumbersome mounting systems in addition to large area solar panels in order to provide a suitable source of power.

SUMMARY

In general, in one aspect, one or more embodiments of the invention are directed to a wireless sensor. The wireless sensor includes an enclosure that houses sensor electronics and wireless communication electronics; a solar panel embedded into the enclosure such that the solar panel forms a first wall of the enclosure; and a light detector disposed in an interior of the enclosure. The light detector measures ambient light within the enclosure. The wireless sensor communicates, via the wireless communication electronics, the measured ambient light within the enclosure. The wireless sensor further comprises a plurality of light detectors.

In general, in one aspect, one or more embodiments of the invention are directed to a method for monitoring a wireless sensor. The method comprises measuring, via a light detector disposed in an interior of an enclosure of the wireless sensor, ambient light within the enclosure, wherein at least part of the ambient light is light passing through a solar panel embedded into the enclosure of the wireless sensor; computing one or more characteristics of the wireless sensor based, at least in part, on the measured ambient light within the enclosure; and communicating, via wireless communication electronics of the wireless sensor to a server, the measured ambient light within the enclosure or the characteristics, or both. The method further includes measuring a state of charge of a battery of the wireless sensor charged by a solar panel of the wireless sensor; and communicating the measured state of charge of the battery to the server and computing the one or more characteristics of the wireless sensor is further based on the measured state of charge of the battery.

Other aspects and advantages of the invention will be apparent from the following description and the appended claims.

DETAILED DESCRIPTION

Figure 1:
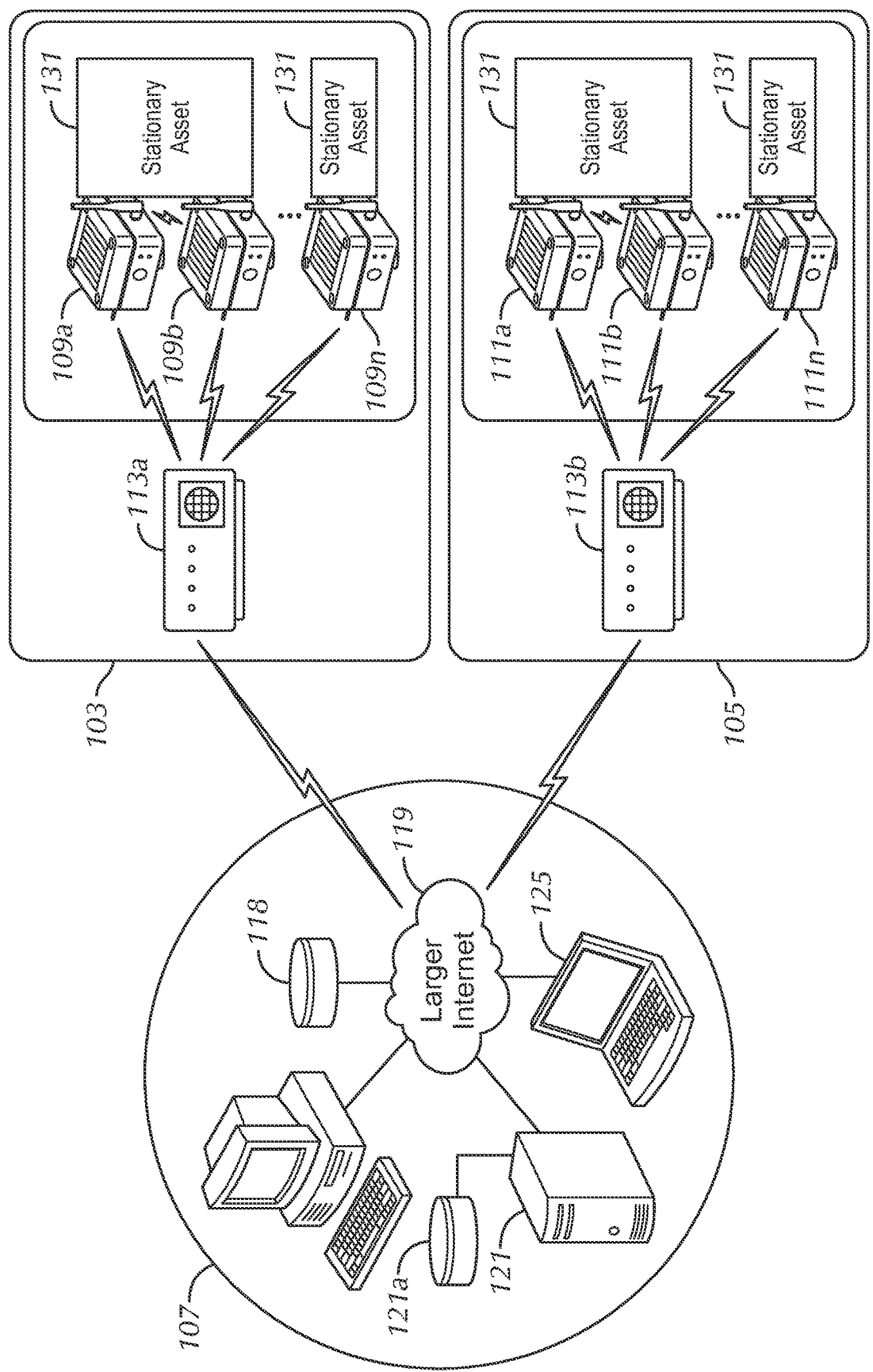
FIG. 1 shows an example of a system for remote monitoring of stationary assets in accordance with one or more embodiments of the invention.

Specific embodiments of a system and method for remote monitoring of stationary assets and specific embodiments of a wireless sensor used in such systems and a method for monitoring the wireless sensor are described in detail with reference to the accompanying figures. Like elements in the various figures (also referred to as FIGs.) are denoted by like reference numerals for consistency.

In the following detailed description of embodiments, numerous specific details are set forth in order to provide a more thorough understanding of the system and method for field monitoring of stationary assets, the wireless sensor used in the system and its monitoring method. However, it will be apparent to one of ordinary skill in the art that these embodiments may be practiced without these specific details. In other instances, well-known features have not been described in detail to avoid unnecessarily complicating the description.

Certain embodiments of the methods disclosed herein in accordance with one or more embodiments of the invention may be implemented on virtually any type of computer or mobile device regardless of the platform being used. For example, a computer system or mobile device includes one or more processor(s), associated memory (e.g., random access memory (RAM), cache memory, flash memory, etc.), a storage device (e.g., a hard disk, an optical drive such as a compact disk drive or digital video disk (DVD) drive, a flash memory, etc.), and numerous other elements and functionalities typical of today's computers and mobile devices. As used herein, a computer system further includes those systems that employ system of a chip (SoC) architectures, application specific integrated circuits (ASIC), field programmable gate arrays (FPGA), microcontrollers, or the like. The computer system or mobile device may also include input means, such as a keyboard, a mouse, microphone, proximity sensor, or touch sensor/screen. Further, the computer may include output means, such as a monitor (e.g., a liquid crystal display (LCD or flat panel monitor). The computer system may be connected to a network (e.g., a local area network (LAN), a wide area network (WAN) such as the Internet, or any other similar type of network) via a network interface connection. Those skilled in the art will appreciate that many different types of computer and mobile device systems exist, and the aforementioned input and output means may take other forms generally known in the art. Generally speaking, the computer system includes at least the minimal processing, input, and/or output means necessary to practice embodiments of the invention.

In general, embodiments of the invention relate to a system and method for remote monitoring of stationary assets, a wireless sensor used in such systems and a method for monitoring the wireless sensor. More specifically, embodiments of the invention relate to a wireless sensor network of extremely small, lightweight, low-maintenance, and low-cost modules for monitoring. for example, oilfield assets and/or environmental or agricultural assets. As used herein, a stationary asset refers to an asset having a fixed geographical location. Furthermore, as referred to herein, a field may be any outdoor region, site, or area including at least one stationary fixed asset to be monitored. The modules may include, for example, wireless sensor modules that are attached to the stationary assets, cellular or satellite modems, and wireless repeater units, at least one of which is located on-site and/or attached to one or more stationary assets. The wireless sensor modules and cellular or satellite modems are configured to automatically associate with one another and to automatically log on, register, and/or report data to, a remote server with minimal or no user input. The modules may be location aware, e.g., may include GPS receivers/chipsets, and may be further configured for straightforward field serviceability, maintenance, and initial configuration, as described in more detail below.

FIG. 1 shows an example of a system for field monitoring of stationary assets in accordance with one or more embodiments of the invention. In the example shown, the system includes two sensor sub-networks 103 and 105, each sub-network in wireless communication with remote server network 107. More specifically, sensor sub-network 103 includes a cellular or satellite modem 113a and a number of wireless sensor modules 109a-109n and sensor sub-network 105 includes a cellular or satellite modem 113b and a number of wireless sensor modules 111a-111n. In accordance with one or more embodiments, wireless sensor modules 109a-109n and 111a-111n are disposed near, or attached to, stationary assets 131 to be monitored. For example, in the case of oil-field monitoring, sensor modules 109a-109n may be attached to storage tanks, pipelines, compressors, beam pumps, etc. Accordingly, the sensor modules themselves may be of several different types, each sensor module being adapted for a particular purpose, e.g., liquid level sensing, flow metering, proximity sensing, noise and vibration sensing, environmental sensing, photo or video capturing, acceleration sensing, vehicle sensing, or any other type of sensor that may find applicability in the field or further described below.

One of ordinary skill will also appreciate that access to the cellular network infrastructure also integrates each sensor sub-network with the larger Internet 119. Accordingly, each cellular or satellite modem may communicate through the cellular network-internet infrastructure in order to exchange data with the remote server network 107. In accordance with one or more embodiments, the remote server network 107 includes one or more remote data storage facilities 118, remote data server 121 that may itself include a local data storage facility 121a. In addition, the remote data storage facility 118 and remote data server 121 may be accessed by way of terminal 123, personal computer 125, or mobile computing device 127, e.g., a cellular phone, smart phone, tablet PC, or the like. As used herein, a data storage facility includes a cloud based remote data center, or any other system that includes network accessible memory locations. Cellular or satellite modems may be directly placed in the transmitter of each wireless sensor module so that the data goes directly to the cloud from each wireless sensor module. Accordingly, the data acquired by the wireless sensor modules may be easily accessible anywhere where internet access or cellular service is available. One of ordinary skill will appreciate that the system may also be deployed within smaller scale local area networks (LANs) or wide area networks (WANs) without departing from the scope of the present disclosure. The cellular or satellite modems 113a, 113b are placed directly within each one of the transmitter of the wireless sensor modules 109a-109n and/or 111a-11 to transfer the data of each one the wireless sensors directly to the cloud.

Figure 2:
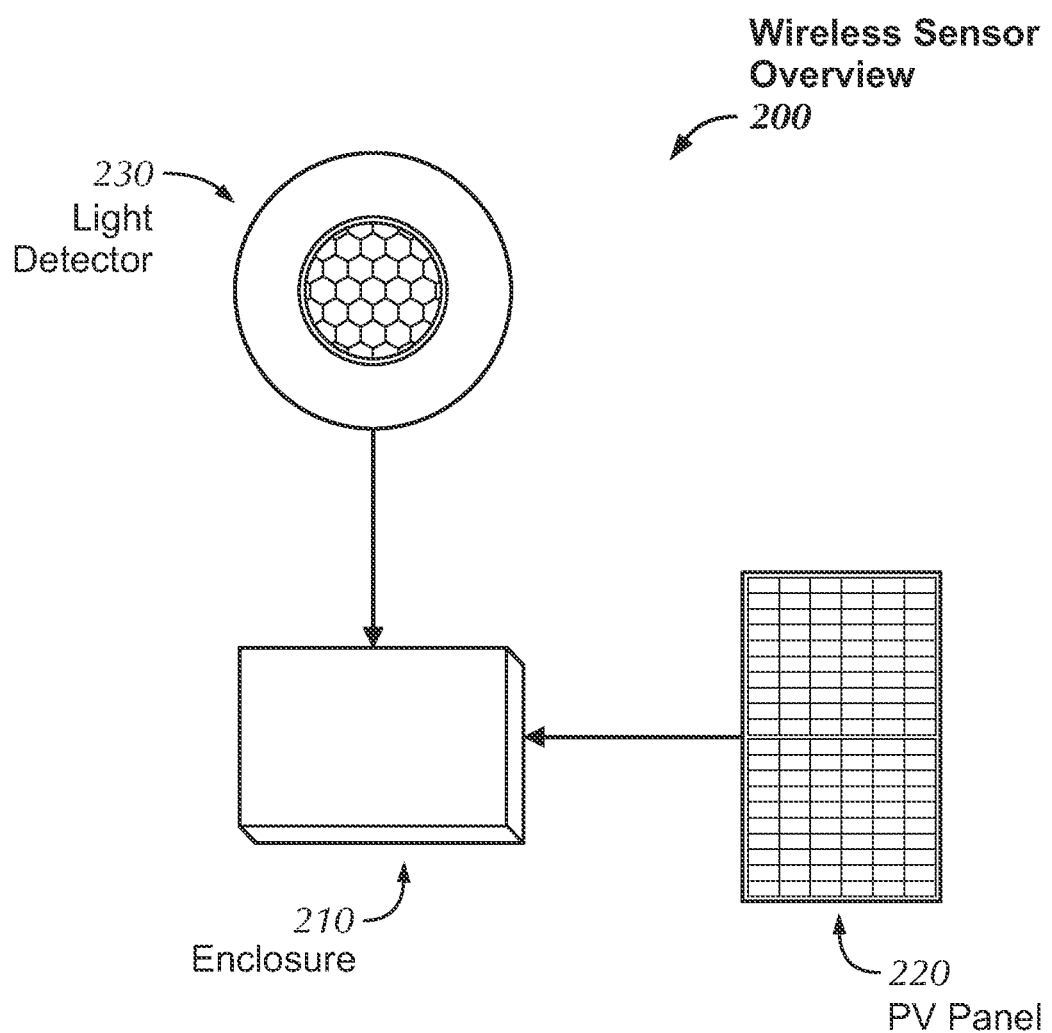
FIG. 2 show an overview of a wireless sensor module for use in a system for remote monitoring of stationary assets in accordance with one or more embodiments of the invention.

FIG. 2 shows an overview of a wireless sensor module for use in a system for remote monitoring of stationary assets in accordance with one or more embodiments of the invention. The wireless sensor 200 includes an enclosure 210, and a solar panel 220, and a light detector 230. Each of these components is subsequently described.

The wireless sensor 200 may be configured as a wireless sensor network (WSN), a group of spatially dispersed sensor nodes, which are interconnected by using wireless communication in the system for field monitoring of stationary assets. Alternatively, each sensor node may contain an internal cellular or satellite modem to communicate directly with a remote system, sometimes called a "cloud" network. Each sensor node may include a processor along with a storage unit, a transceiver module, a single wireless sensor 200 or multiple wireless sensors 200, along with an analog-to-digital converter (ADC), and a power source such as a battery. The WSN may optionally include a positioning unit and/or a mobilization unit. Each sensor node uses its wireless sensor(s) 200 in order to measure the fluctuation of light/current conditions in its adjacent environment. These measurements are converted, via the ADC unit, into relative electric signals which are processed via each node's processor. Via its transceiver, each node may wirelessly transmit the data produced by its processor to other nodes or/and to a selected cellular or satellite modem which transfers the data directly to the cloud.

Each cellular or satellite modem, by using the data transmitted to itself, is able to both perform supervisory control over the WSN it belongs to and transmit the related information to users or/and other networks. The collaborative use of a sufficient quantity of such sensor nodes, enables a WSN to perform simultaneous data acquirement of ambient information at several points of interest positioned over wide areas of the system for remote monitoring of stationary assets.

The solar cells of the solar panel 220 may be made from amorphous silicon (a-Si), polycrystalline silicon (pc-Si), monocrystalline silicon (mc-Si), semiconductor compounds (CdTe, CIS, chalcopyrites, GaAS, InP), or other conception such as dye sensitized. The performance of the solar panel 220 varies by region, geographical location and climatic conditions, so it may be important to determine the type of solar panel to be used depending on weather conditions. The performance of the solar panel 220 depends on many factors. Light gathering is dependent on the angle of incidence of the sun light rays to the surface of the solar cells, and the closer to perpendicular, the greater the power. The wireless sensor unit 210 may be tilted to face the sun by maintaining the angle of incidence as close to 0° as possible in order to maintain the maximum power output from the fixed solar panel 220. Light gathering is also dependent on environmental factors such as cloudiness, occurrence of nearby or overhanging objects providing shade, and the presence of occluding materials present on the solar panel such as snow, dirt, or dust.

The light detector 230 may be of any light sensitive type. Examples include photodiodes, photoresistors, phototransistors, and photovoltaic light sensors. Other types include avalanche photodiodes (APD) or single photon avalanche diodes (SPAD). The light detector can be an active device, converting light into an electrical current or pulse, or a passive device, changing an electrical property such as resistance in proportion to the amount of light received.

Figure 3A:
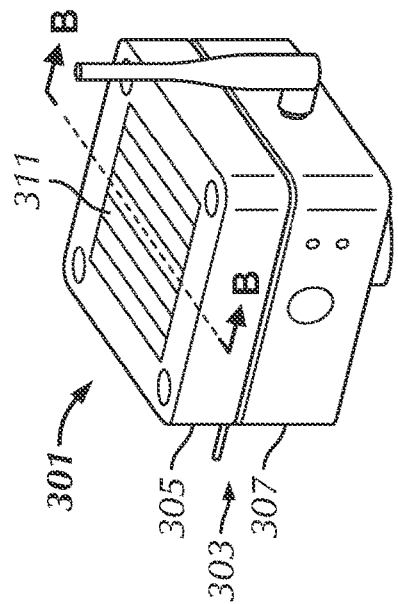
FIGS. 3A-3C show an example of a wireless sensor module for use in a system for remote stationary asset monitoring in accordance with one or more embodiments of the invention.
Figure 3A:
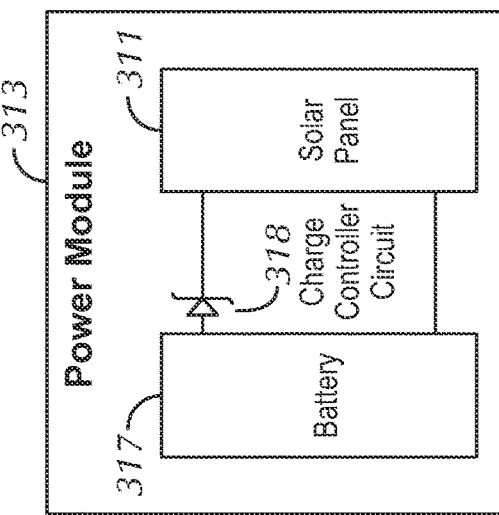

FIG. 3A shows an example of a wireless sensor module for use in a system for remote stationary asset monitoring in accordance with one or more embodiments of the invention. In accordance with one or more embodiments, the wireless sensor module 301 is housed within an environmentally isolated enclosure 303. In accordance with one or more embodiments, the enclosure 303 is fabricated from a durable material that is able to withstand prolonged exposure to UV light in addition to extreme temperature swings. In accordance with one or more embodiments, the enclosure 303 may be fabricated from acrylonitrile butadiene styrene (ABS), polycarbonate, or any other durable material. In addition, the enclosure 303 may further include a lid 305 and a body 307. The lid 305 and body 307 may be securely joined by any method known in the art, e.g., by way of screws (not shown), or the like. In accordance with one or more embodiments, the lid 305 and body 307 are sealed together by way of a silicone rubber gasket 309, or the like, as shown in the cross sectional view of FIG. 3B. Other embodiments can consist of two piece injection molded enclosures that may be fused together with glue or ultrasonic welding. Other embodiments can consist of a single-piece manufactured enclosure in which the solar panel is embedded in the top. Enclosure 303 may have a NEMA 4 rating that conforms with Class I, Division I or II oilfield or hazardous environment use.

Figure 3B:
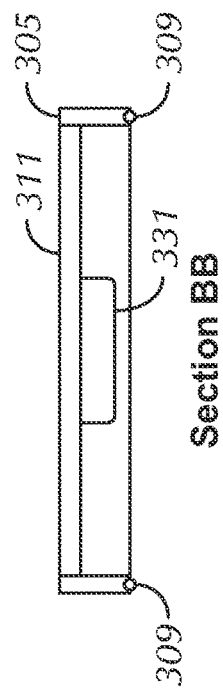

Furthermore, as shown in FIG. 3A, one or more embodiments of the wireless sensor module may include a solar panel 311 integrated into a top surface of the lid 305 or side of the enclosure. The solar panel 311 may be attached within an access profile formed within a central portion of the lid or side of the enclosure, as shown in FIG. 3B. In another embodiment (not shown), the solar panel may fit into a recess milled within the top surface of the lid 305 or side of the enclosure. One of ordinary skill will appreciate that many different methods of mounting the solar panel within the enclosure are possible without departing from the scope of the present disclosure. One of ordinary skill will also appreciate that the size and shape of the enclosure may vary depending on the particular application. For example, higher power budgets may require a solar cell of relatively large surface area thereby requiring a large enclosure. In other embodiments that require less demanding power budgets, relatively small solar panels and, consequently, relatively small enclosures may be employed. In accordance with one or more embodiments, the power draw of the internal circuitry 315 of the wireless sensor module 301 is optimized to require a solar panel 311 with a low power output.

Figure 3C:
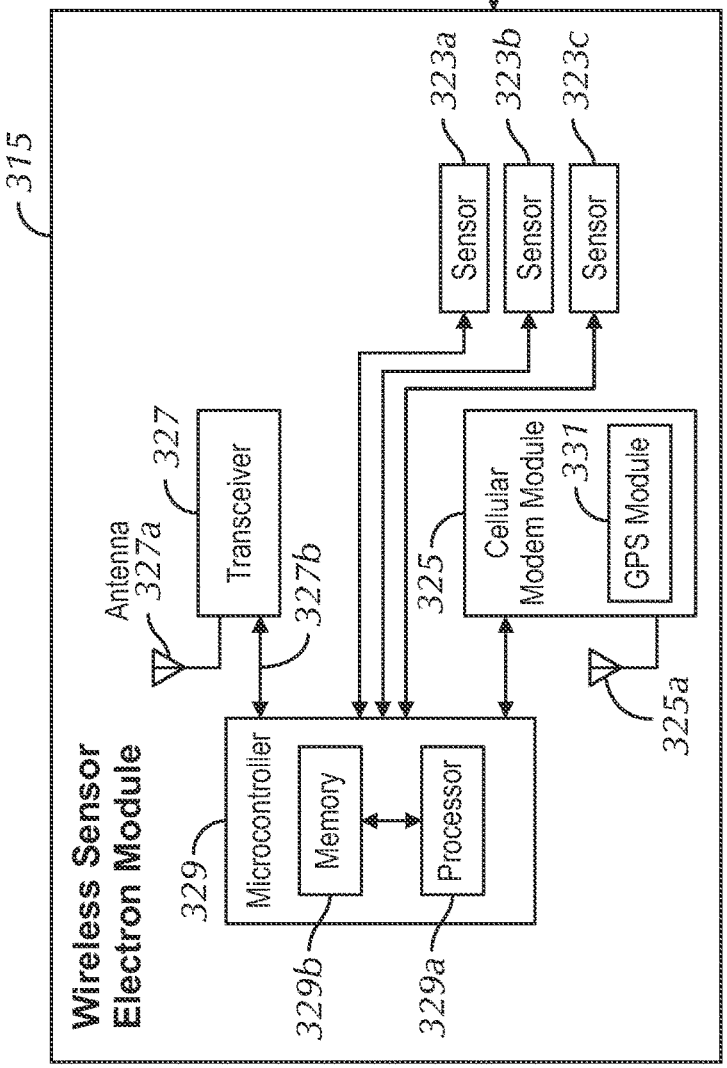

FIG. 3C shows a block diagram of the internal hardware associated with the wireless sensor module 301 in accordance with one or more embodiments of the present invention. In this example, the wireless sensor module 301 includes a power module 313 and a wireless sensor electronics module 315. In accordance with one or more embodiments, the power module 313 includes the solar panel 311 and a battery 317 for providing power to wireless sensor electronics module 315. Furthermore, in accordance with one or more embodiments, the power module 315 is configured to provide power to the wireless sensor electronics module 315 by way of battery 317. One of ordinary skill in that art will appreciate that the size and type of internal battery or batteries will vary according to the power budget of the specific type of sensors being deployed, the data acquisition and transmission frequency desired, and the availability and amount of light radiation to provide sufficient solar power.

Returning to the description of the wireless sensor electronics module 315, the microcontroller 329 serves as the master controller for the wireless sensor electronics module 315. Accordingly, the transceiver 327 includes interface 327b for communication with and for programing by way of the microcontroller 329. The microcontroller may be any microcontroller known in the art, e.g., as described above in reference to FIGS. 2A-2C. The microcontroller 329 is configured to receive sensor output from sensors 323a-323c. In addition, microcontroller 329 is configured to interface with transceiver 327 in order to transmit to the cellular or satellite modem any acquired asset data as received from sensors 323a-323c.

One of ordinary skill will appreciate that the number and types of sensors and of transceivers is only limited by the choice of hardware and, thus, the particular hardware discussed herein and shown in FIG. 3 is not meant to limit the scope of the present invention to only the mentioned hardware but rather, the above specific examples and specifications are provided merely by way of example. The transceiver 327 further includes interface 327b for communication with microcontroller 329. In addition, while one way communication between the wireless sensor modules 315 and the cellular or satellite modem is described in the above example, one of ordinary skill will appreciate that two-way communication between the cellular or satellite modem and wireless sensor module is possible and sensor-to-sensor communication is possible without departing from the scope of the present disclosure. Furthermore, sensors and/or cellular or satellite modems may communicate with one or more intermediate repeater modules, if necessary.

In accordance with one or more embodiments, the sensors 323a-323c may provide information relating to the asset being monitored by the wireless sensor module 301, as described in more detail below. For example, the wireless sensor module 301 may be a fluid level detector mounted to a fluid tank, an accelerometer/orientation detector, mounted to a pump or level control system. Other sensor types include, e.g., microphones and magnetometers. While three sensors are shown in the example, one or ordinary skill will appreciate that any number of sensors may be used without departing from the scope of the present invention. For example, the sensors 323a, 323b, . . . 323n may be sensors designed to measure temperature, pressure, acceleration, magnetic field, electric field, humidity, or any other known sensor. In accordance with one or more embodiments, the temperature of the wireless sensor electronics module 315 may be monitored by way of the on-board temperature readings.

Figure 4:
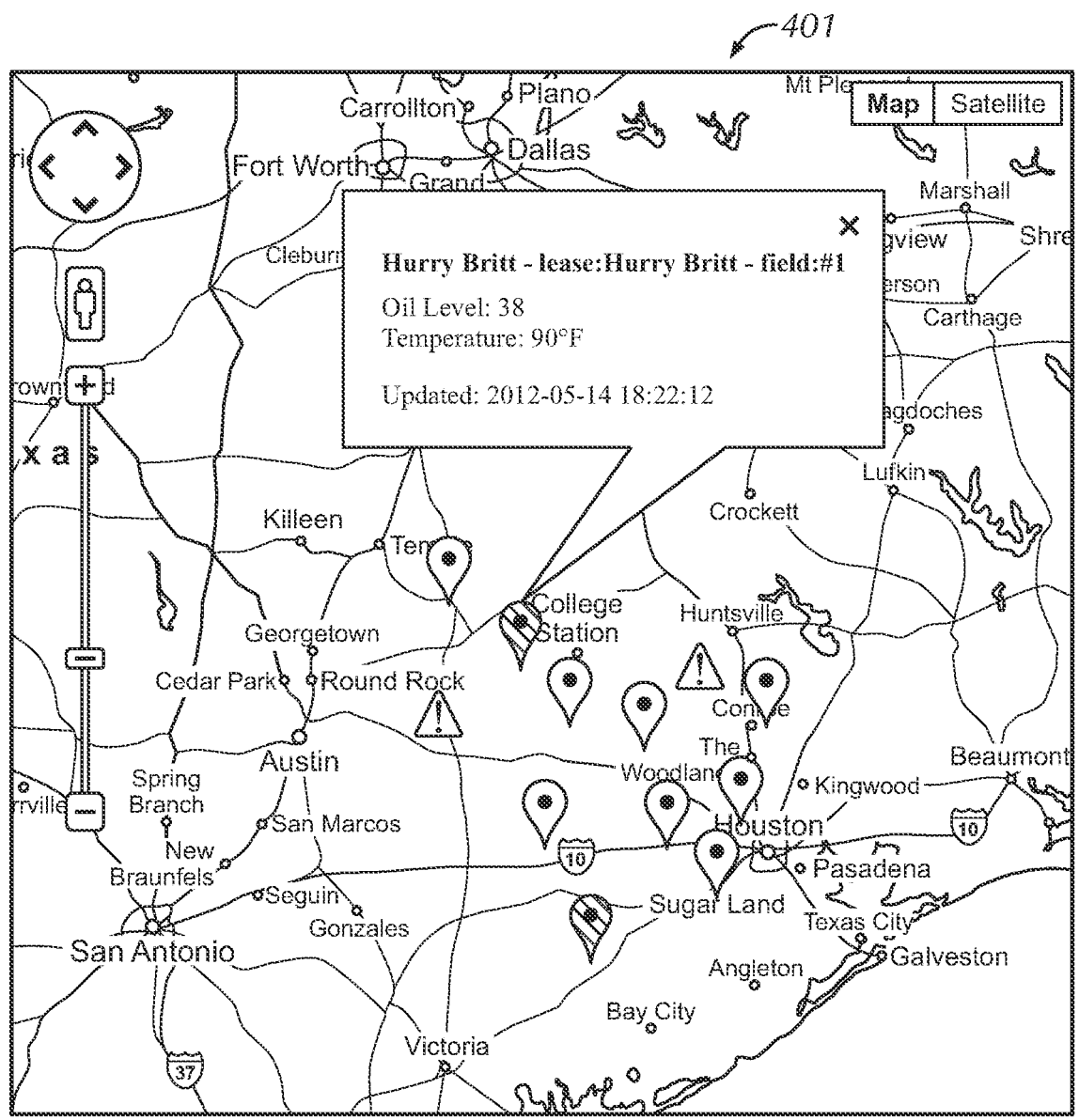
FIG. 4 shows one example of a graphical user interface in accordance with one or more embodiments of the invention.

FIG. 4 shows one example of a graphical user interface 401 in accordance with one or more embodiments of the invention. As shown in the FIG. 4, a map is displayed with the map including regions that correspond to any number of assets being monitored. The regions also include icons indicating the location and/or status of any particular sensor location. For example, icons may include sensors with no active alarm states, which may be shown in green, while other colors, icons or exclamation icons may indicate one or more active alarm states, which may be shown in a different color such as red. The size, shape and color of the icons used in this particular example map are meant only as examples and, thus, one of ordinary skill having the benefit of this disclosure will appreciate that innumerable different types of icons or indicator may be used without departing from the scope of the present disclosure. As described above, in response to a user input, e.g., a mouse click or finger touch made in a map region that includes an indicator corresponding to a field, the sensor values for one or more stationary assets located in the field will be displayed. In the example shown in FIG. 4, Field #1 is displayed and two sensor values associated with a stationary asset are displayed: the current temperature and the oil level in an oil tank. As described above, these sensor values may originate from one or more wireless sensor modules in the field and transmitted to the remote server by way of a wireless gateway co-located in the field with the stationary asset being monitored.

Further to the previous example of uploading device information, a smart cellphone, tablet or portable computer may be used to display the current or near real-time data transmitted by a wireless sensor, repeater or gateway. For instance, by touching the sensor, repeater or gateway device in a programmed manner, the device can be instructed to immediately transmit its most recently acquired data to the online database, which can then immediately transmit the information directly to the user's cellphone or computer for display. In this manner the user's cellphone or computer may be used as a virtual sensor display device. This eliminates the need for incorporating complex or costly display elements on the modules. In addition, along with the internal antenna and proximity sensor features, the enclosures will enjoy maximum durability and weatherability by minimizing penetrations, attachments and breaches of the enclosure surfaces.

Figure 5:
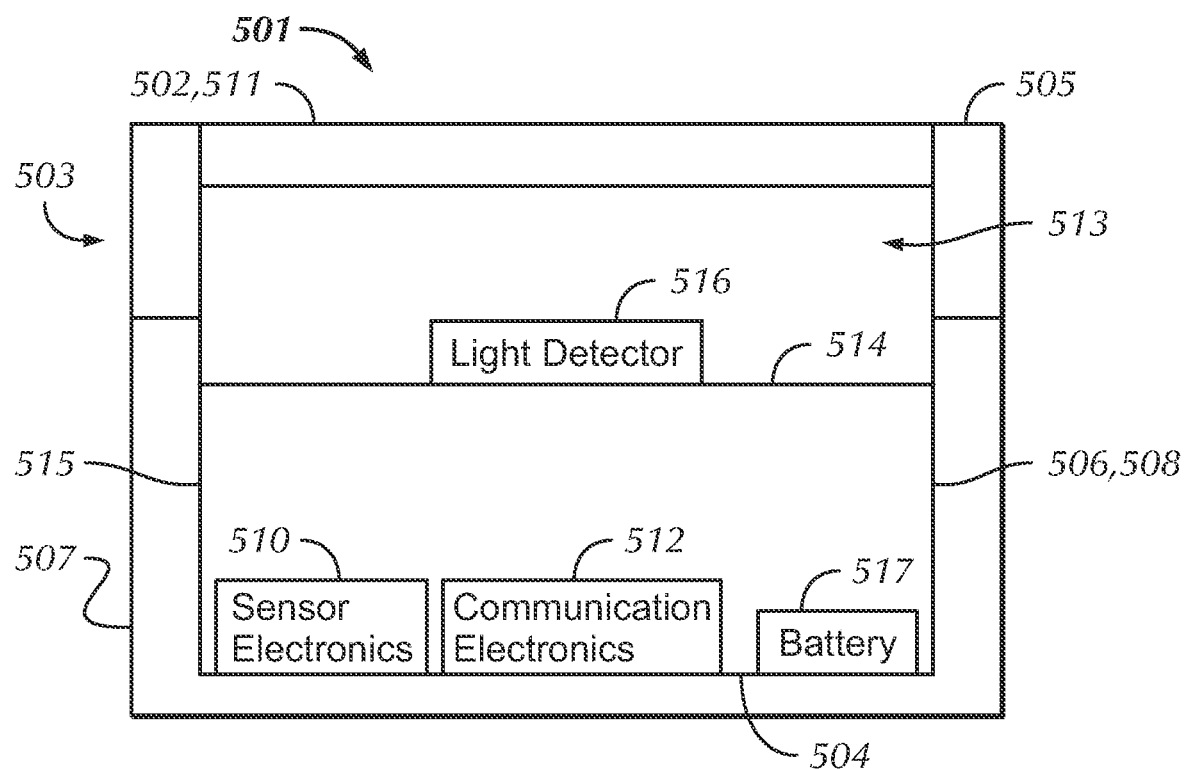
FIG. 5 shows a diagram of a wireless sensor module including a light detector in accordance with one or more embodiments of the invention.

FIG. 5 shows a diagram of a wireless sensor including a light detector in accordance with one or more embodiments of the invention. The wireless sensor module 501 is similar to the wireless sensor module 301 shown in FIG. 3 described above. The enclosure 503, the lid 505, the body 507, and the solar panel 511 are similar to the enclosure 303, the lid 305, the body 307, and the solar panel 311 described above. Similar components between the two wireless sensor modules (i.e., 301 and 501) have the same description. The solar panel 511 forms a first wall 502 (for example, a top wall) of the enclosure 503. In the embodiment shown, the first wall 502 of the enclosure is a flat wall of the lid 505. As the solar panel 511 forms a wall (the first wall 502 in the embodiment shown) of the enclosure 503, light incident on the solar panel 511 that is not completely absorbed by the solar panel 511 may pass through the solar panel 511 into an interior 513 of the enclosure 503, as described in more detailed below. One of ordinary skill will also appreciate that the amount of light that passes through the solar panel 511 into the interior 513 of the enclosure 503 may vary as the size of the solar panel 511 varies.

As shown in FIG. 5, one or more embodiments of the wireless sensor module 501 may include sensor electronics 510, communication electronics 512, and a battery 517 that are disposed on a second wall 504 (for example, a bottom wall) of the enclosure 503 opposing the first wall 502 of the enclosure 503. In one or more embodiments, the sensor electronics 510 and communication electronics 512 together may form the wireless sensor electronics module 315 as shown in FIG. 3C and include the corresponding components thereof as described above. For the sake of brevity, description of those components of the wireless sensor electronics module 315 will not be repeated here. Furthermore, in accordance with one or more embodiments, the battery 517 is configured to provide power to the sensor electronics 510 and communication electronics 512 and to be charged by the solar panel 511.

Furthermore, as shown in FIG. 5, the wireless sensor 501 further includes a light detector 516. It is well known that light incident on a solar panel may not be completely absorbed by the solar panel, depending on the type of material and construction of a solar panel. Therefore, a portion of the light may pass through the solar panel 511 and into the interior of the enclosure 503 of the wireless sensor module 501. Thus, whenever the solar panel 511 is placed under or near a light source, because there is light incident thereon, light may also pass into the interior 513 of the enclosure 503 due to transmission of a portion of the light through the solar panel 511.

In accordance with one or more embodiments, the solar panel 511 may be configured in a way that light passes through the solar cells characterized by a low visible light transmissivity (e.g., generally opaque in the visible spectrum) as described above.

In accordance with one or more embodiments, the solar panel 511 may be configured in a way that light passes through the gaps between solar cells assembled in the solar panel 301 as shown in FIG. 3A. In FIG. 3A, the gaps of the series dotted lines through the solar panel 301 represent the gaps between solar cells. Because solar cells generally produce only 0.6 to 1.0 volt, a common manufacturing technique is to arrange an array of small solar cells in a panel, wiring their output in series to increase the final output voltage. Small gaps will normally remain between the individual cells in the grid array. Since the panels are usually manufactured using a clear glass substrate, these gaps allow a small fraction of full-spectrum light to pass. This is enough to be detected, amplified, and processed by a light detector located behind the solar panel 511. For example, the light detector may be of any light sensitive type similar to the light detector 230 described above.

In accordance with one or more embodiments, the solar panels may be configured in a way that light passes a transparent or semi-transparent photovoltaic (PV) panel. The transparent PV panel may be created to allow visible light to pass while still generating electricity using infrared wavelengths. This enables the panel to be used in windows, skylights, and smaller transparent surfaces such as small touch screens. For reference, see manufacturers of large size PV windows such as ONYX SOLAR™ and CLEARVUE™ PV. Standard visible or IR detectors as the ones described above, when the solar panel is configured in a way that light passes through the gaps between solar cells, may be used in this case. This configuration type allows the highest transmitted radiation. The panels efficiency will not be used as much to provide power for a small wireless device.

Figure 8:
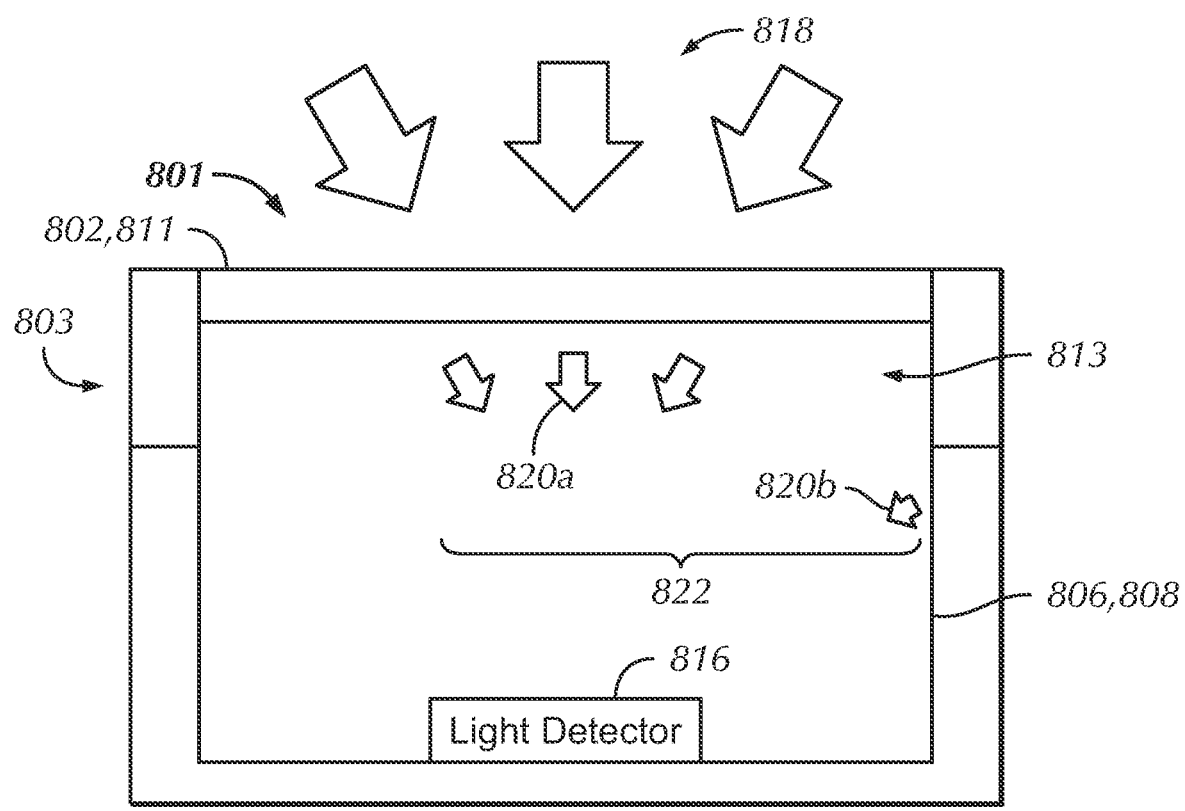
FIG. 8 is a schematic diagram explaining the generation of ambient light within an enclosure of a wireless sensor module in accordance with one or more embodiments of the invention.

FIG. 8 is a schematic diagram explaining this phenomenon, in which the internal elements of the wireless sensor other than the light detector are not shown. As shown in FIG. 8, light 818 is incident on the solar panel 811 (or the first wall 802) of the wireless sensor 801. The light 818 may include direct light (e.g., direct light from the sun on a clear day) and/or diffuse light (e.g., light from the sun that is diffused by the cloud, air particles, etc.). In one or more embodiments, an anti-reflection coating (not shown) may be applied to the surface of the solar panel 811 onto which the light 818 is incident. Other known methods such as surface texturing may also be used to reduce the reflection of the light 818 incident on the solar panel 811. In other embodiments, the solar panel 811 is not pre-treated to reduce reflection level. The use of a pre-treatment or not may be based on characteristics of the environment in which the sensor is intended to be deployed or based on the anticipated power budget of the wireless sensor 1001.

Excluding the reflection factor already considered, a portion of the remainder of the light 818 incident on the solar panel 811 is absorbed by the solar panel 811 to primarily generate electrical power used for charging the battery of the wireless sensor 801 and/or powering the individual components such as the sensor electronics 510 and communication electronics 512 shown in FIG. 5. A portion 820a of the light 818 neither reflected nor absorbed by the solar panel 811 passes through the solar panel 811 into the interior 813 of the enclosure 803. As the light 818 may be incident on the solar panel 811 with different incident angles (especially in the case of diffuse light), the light 820a passing through the solar panel 811 may travel in different directions within the enclosure 803. Even with direct light (and diffuse light alike) passing through the solar panel 811, a portion 820b of the light 820a may be reflected off an inner surface 806 of the enclosure 803, such as an inner surface of side walls of the enclosure 803 and/or an inner surface of a bottom wall of the enclosure 803. Together the light 820a and the light 820b form an ambient light 822 within the enclosure 803 that can be detected/measured by the light detector 816. In one or more embodiments, a reflective coating 808 may be applied to an inner surface 806 of the enclosure 803 (e.g., an inner surface of the side walls of the enclosure 803) to increase the portion 820b of the ambient light 822 by lowering absorption of the light 820a passing through the solar panel 811 by the inner surface 806 of the enclosure 803. This may increase the amount of light incident on and absorbed by the light detector 816.

Turning back to FIG. 5, the light detector 516 is disposed in the interior 513 of the enclosure 503 such that the light detector 516 can measure the ambient light within the enclosure 503. One of ordinary skill will appreciate that the light detector 516 may be disposed anywhere in the interior 513 of the enclosure 503 to fulfill the purpose of measuring the ambient light because the ambient light within the enclosure 503 will "light up" the entire interior 513 as described above with reference to FIG. 8. In the embodiment shown in FIG. 5, the light detector 516 is disposed at a center position of the interior 513 of the enclosure 503, which may be an optimal position to detect the ambient light. In this case, a partition 514 may be provided in the interior 513 of the enclosure 503 and the light detector 516 may be disposed on the partition 514. In the embodiment shown, the partition 514 is detachably attached to the side walls of the enclosure 503. In other embodiments, a support attached to and elevated from the bottom wall of the enclosure 503 may be provided instead of the partition 514. One of ordinary skill can envisage any other mechanical methods for disposing the light detector 516 in any position within the interior 513 off the walls of the enclosure 503 without departing from the scope of the present disclosure.

The partition 514 may be made of any suitable material such as plastic. In one or more embodiments, the partition 514 is made of a transparent material, allowing the ambient light to pass through. The light detector 516 may be attached to the partition 514 by way of an adhesive. In one or more embodiments, the light detector 516 is fitted into an aperture of the partition 514, which is described in more detail below. In these embodiments, the light detector 516 may have two opposite surfaces exposed to the ambient light, allowing more ambient light to be detected. In one or more embodiments, an inner surface 506 of the enclosure 503 (e.g., an inner surface of the side walls of the enclosure 503 and/or an inner surface of the bottom wall of the enclosure 503) is lined with a reflective coating 508. In one or more embodiments, irrespective of the partition 514 being transparent or non-transparent, a surface the partition 514 which faces the solar panel 511 and on which the light detector 516 is disposed may be lined with a reflective coating. In these embodiments, the reflective coating 508 applied to the inner surface 506 of the enclosure 503 may be applied to only the portion of the inner surface 506 above the partition 514. In one or more embodiments, the light detector(s) 516 is mounted directly on the main system circuit board to promote simplified manufacturing and assembly because this configuration avoids the need for a partition or separate wall-mounted detector configuration.

In one or more embodiments, the light detector 516 may operate under a bias voltage and, thus, is electrically connected to the battery 517 as a source of the bias voltage. The light detector 516 may also be connected to a microcontroller of the sensor electronics 510 and communication electronics 512 (e.g., the microcontroller 329 as described with reference to FIG. 3) for transmission of a control signal and detection data. For the sake of clarity, any connection or wiring between any two of the light detector 516, the sensor electronics 510, the communication electronics 512, and the battery 517 are not shown. Once the ambient light data is collected, the wireless sensor module 501 may be sent, via the communication electronics 512, to the remote data server 121 as is done for other sensor data.

Figure 6:
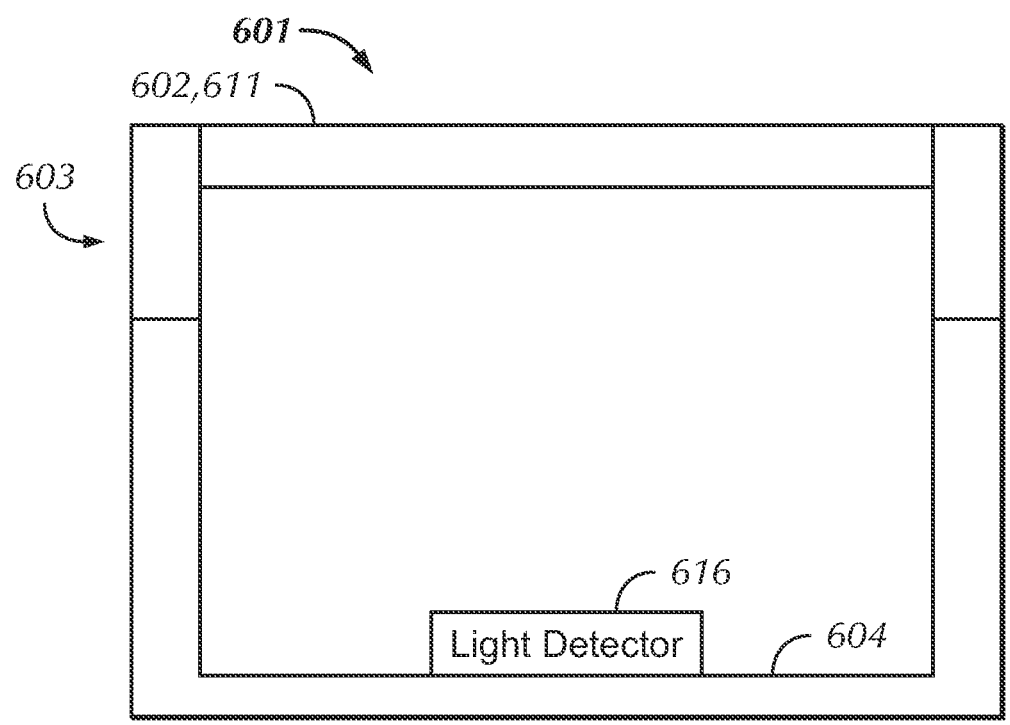
FIG. 6 shows a diagram of a wireless sensor module including a light detector in accordance with one or more embodiments of the invention.
Figure 7D:
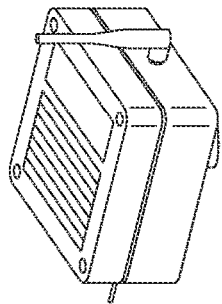
FIG. 7A-7K show non-limiting design examples of a wireless sensor accordance with one or more embodiments of the invention.
Figure 7H:
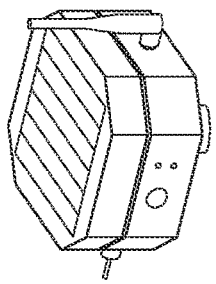
Figure 7K:
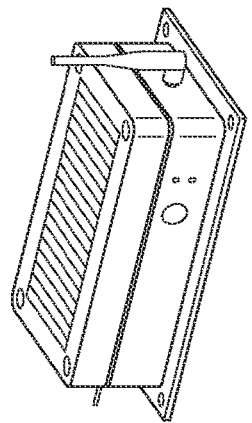
Figure 7C:
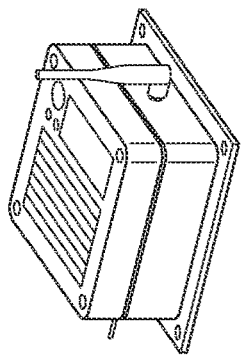
Figure 7G:
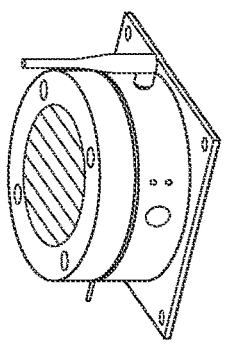
Figure 7J:
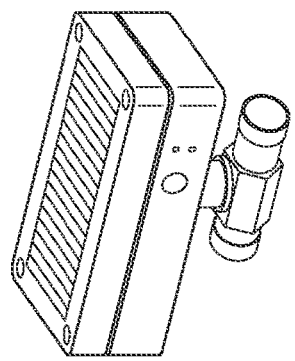
Figure 7B:
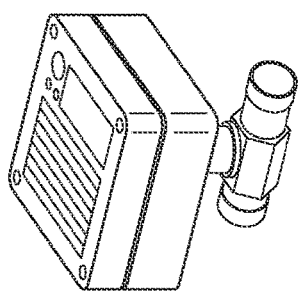
Figure 7F:
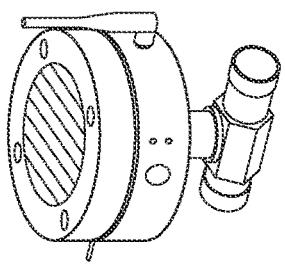
Figure 7A:
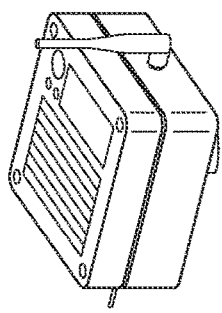
Figure 7E:
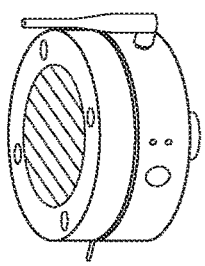
Figure 7I:
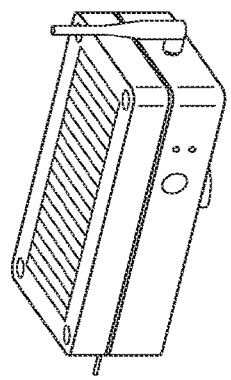

FIG. 6 shows a diagram of a wireless sensor including a light detector in accordance with one or more embodiments of the invention. The embodiment shown in FIG. 6 differs from the embodiment shown in FIG. 5 mainly in the position of the light detector and the absence of a partition or support for the light detector. For the sake of clarity, among the internal elements of the wireless sensor module 601, only the light detector 616 is shown. As shown in FIG. 6, the solar panel 611 forms a first wall 602 of the enclosure 603 of the wireless sensor module 601. The light detector 616 is disposed on a second wall 604 of the enclosure 603, for example a bottom wall or a side wall of the enclosure 603). As the light detector 616 is disposed on a wall of the enclosure 603, a partition or support may not be needed. In the embodiment shown, the light detector 616 is disposed on the bottom wall of the enclosure 603, having a detection surface thereof facing the solar panel 611 through which the ambient light originates. Although not shown, the other internal elements of the wireless sensor 901, such as the sensor electronics 810, the communication electronics 512, and the battery 817 shown in FIG. 5, may also be disposed on the bottom wall of the enclosure 603. The light detector 616 may also be embedded as a component on one of the circuit boards disposed within the enclosure. The arrangement of the elements in these embodiments may simplify the structure of the wireless sensor.

In each of the embodiments described above, the light detector could be of different types depending on the environment in which the wireless sensor is intended to operate. As an example, the light detector may include a photodiode. The photodiode may operate in a photovoltaic mode or a photoconductive mode. In the photovoltaic mode, the photodiode is not biased by an external voltage and operates in a similar way as the solar panel. That is, the photodiode generates a voltage upon absorbing the ambient light. The generated voltage, or a current caused by the generated voltage through a load, has a positive correlation with the power of the ambient light and can be picked up with any known methods to measure the ambient light. In the photoconductive mode, the photodiode is reserve biased with a voltage supplied by, for example, the battery of wireless sensor or a suitable regulated power supply that itself is powered from the battery. An output current is proportional to the power of the ambient light and can be picked up with any known methods to measure the ambient light. As another example, the light detector may include a photoconductor, also known as photoresistor. The photoconductor operates in a similar way as a photodiode operating in the photoconductive mode. The photoconductor is reserve biased, and an output current can be picked up to measure the ambient light.

In one or more embodiments, once the ambient light is measured by the light detector, the light incident on the solar panel can be calculated. As an example, a power of the light incident on the solar panel at any given point of time can be calculated. As another example, an amount of the light incident on the solar panel in a predetermined period of time can be calculated by integrating the power of the light over the predetermined period of time. The calculations can be calibrated with any known methods, taking into account factors such as the materials, efficiencies, thickness, and sizes of the solar panel and the light detector, and the transmission spectrum of the solar panel, etc. The calibration may be done in a laboratory setting with artificial lighting or in an outdoor setting with natural light.

In one or more embodiments, the light detector may be made from any suitable material depending on the environment in which the wireless sensor is intended to operate and the material from which the solar panel is made. Examples of materials for the light detector include, but are not limited to, element semiconductors such as monocrystalline silicon, polycrystalline silicon, and amorphous silicon, group III-V compound semiconductors such as InGaAs (indium gallium arsenide), organic semiconductors, etc. In one or more embodiments, the light detector and the solar panel may be made from the same material, such as monocrystalline silicon. In these embodiments, as the light detector and the solar panel are made from the same material, they have the same absorption spectrum and spectral response. This may help simplify the calibration process. In other embodiments, the light detector and the solar panel may be made from different materials. In these embodiments, as the light detector and the solar panel are made from different materials, they have different absorption spectra and spectral responses. For example, the light detector may have a spectral response more sensitive to longer wavelengths than that of the solar panel. This may be beneficial in terms of detection sensitivity and measurement accuracy of the light detector, as described in more detail with reference to FIG. 9 below.

FIG. 7A-7K show non-limiting design examples of a wireless sensor accordance with one or more embodiments of the invention. One of ordinary skill will appreciate that the wireless sensor may be designed in any suitable shape to fulfill the purpose of remote stationary asset monitoring as described above with reference to FIG. 3A.

Figure 9:
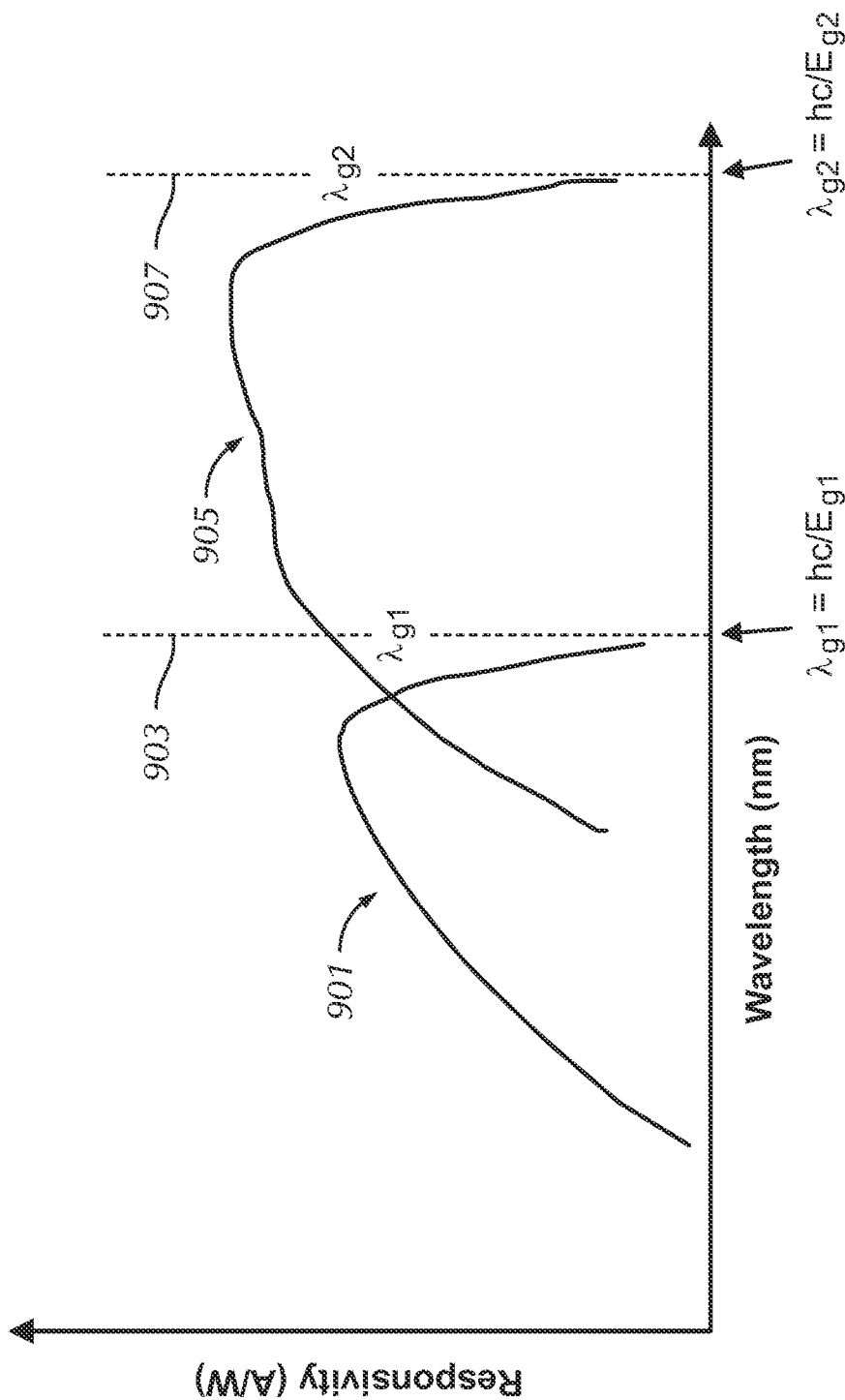
FIG. 9 schematically shows a graph of responsivities of two different semiconductor materials in accordance with one or more embodiments of the invention.

FIG. 9 schematically shows a graph of responsivities of two different semiconductor materials in accordance with one or more embodiments of the invention. As shown in FIG. 9, a first material may have a responsivity curve 901 and a second material may have a responsivity curve 905. The responsivity curves 901 and 905 show that the second material is more sensitive to light (electromagnetic waves) of longer wavelengths than the first material. Each of the responsivity curves 901 and 905 also show in an approximate manner the wavelength $\lambda_g$ corresponding to the band gap Eg of each of the first and second materials. As shown in FIG. 9, a vertical dash line 903 indicates the wavelength $\lambda_{g1}$ corresponding to the band gap $E_{g1}$ of the first material.

Similarly, a vertical dash line 907 indicates the wavelength $\lambda_{g2}$ corresponding to the band gap $E_{g2}$ of the second material. One of ordinary skill will appreciate that, for a known material, the wavelength $\lambda_g$ and the band gap Eg is correlated by the equation $\lambda_g$=hc/Eg, where h is the Planck constant and c is the speed of light.

In one or more embodiments, the solar panel may be made from the first material and the light detector may be from the second material. For example, the first material may be silicon and the second material may be InGaAs. Other combinations of materials are also possible as long as the second material is more sensitive to light of longer wavelengths than the first material. One of ordinary skill will appreciate that light of different wavelengths has different absorption depths with respect to a given material. The absorption depth is a valuable factor which defines the distance from the surface into the material at which the light falls to around 36% of the original intensity, and light of higher energy (shorter wavelength) has a smaller absorption depth. For example, for a given material such as silicon, blue light will be fully absorbed as it travels a few microns into the material, while red light is not fully absorbed even after a few hundred microns. Depending on the material and thickness of the solar panel of the wireless sensor, the light that passes through the solar panel into the interior of the enclosure (the ambient light within the enclosure) will have different spectral characteristics than those of the light incident on the solar panel (for example, sunlight). The proportion of components of longer wavelengths in the ambient light will be larger than that in the light incident on the solar panel, while the intensity of the ambient light is lower than that of the light incident on the solar panel. Therefore, from a standpoint of increasing the detection sensitivity and measurement accuracy of the light detector, the light detector may be made of a material that is more sensitive to light of longer wavelengths than the material from which the solar panel is made, such as the second material versus the first material as illustrated in FIG. 9.

Figure 10A:
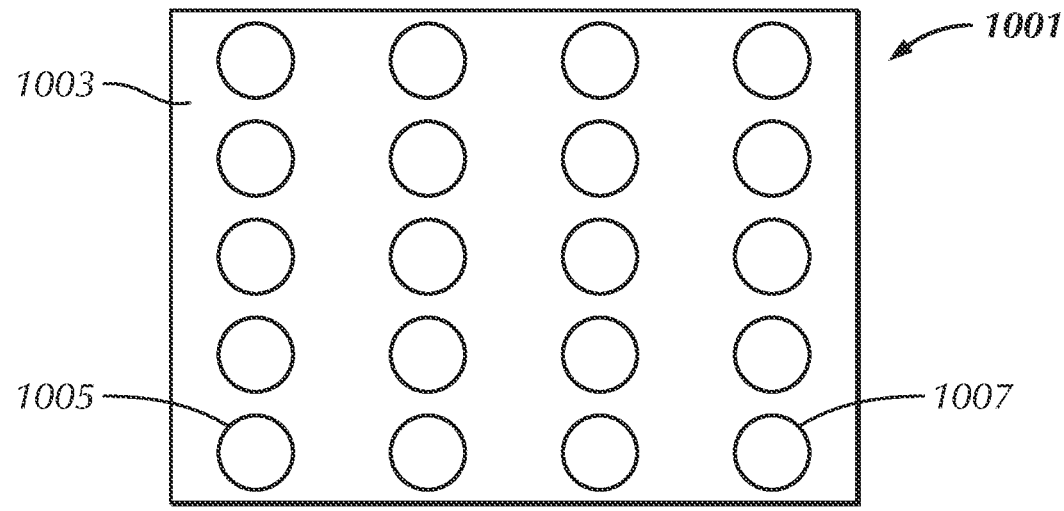
FIGS. 10A and 10B each show a diagram of a pattern of disposed light detectors in accordance with one or more embodiments of the invention.
Figure 10B:
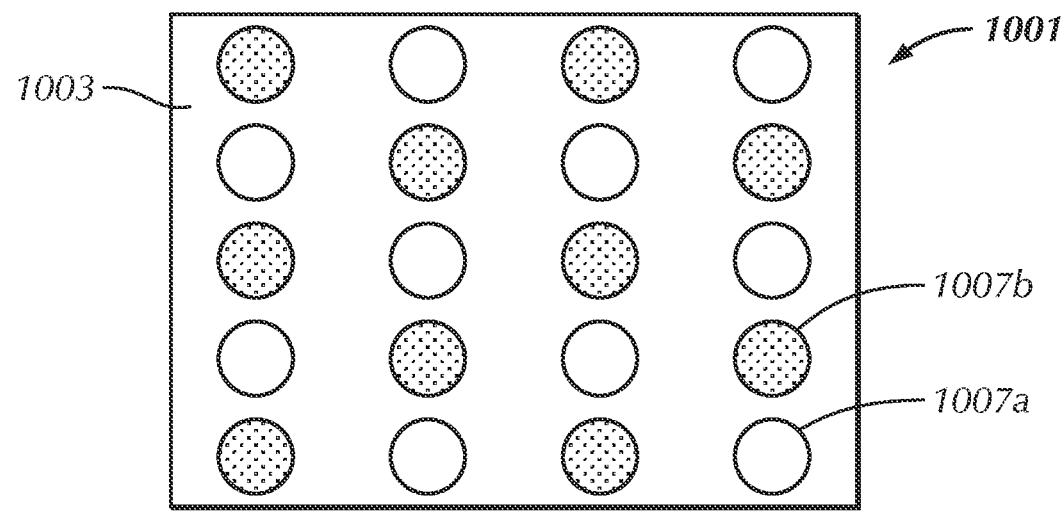

In the embodiments shown in FIGS. 5 and 6, a single light detector is shown. In one or more embodiments, the light detector may include a plurality of light detectors. FIGS. 10A and 10B each show a diagram of a pattern of disposed light detectors. As shown in FIGS. 10A and 10B, a plurality of light detectors are distributed over an area 1001. Similar to the embodiments of FIGS. 5 and 6 in which a single light detector is shown, the plurality of light detectors may be disposed on a partition or support within the interior of the enclosure of the wireless sensor or on a wall (e.g., bottom wall) of the enclosure. In the case of using a partition, the area 1001 may correspond to the partition. As shown in FIGS. 10A and 10B, the partition may have a body 1003. In one or more embodiments, the plurality of light detectors may be attached to the body 1003, for example, by way of an adhesive. In other embodiments, the body 1003 may include apertures 1005 that have a shape corresponding to the shape of the light detectors. The light detectors are securely fitted into the apertures 1005. In these embodiments, the partition body 1003 may be made from a transparent material, allowing the ambient light to pass through. In this way, each of the light detectors may have two opposite surfaces exposed to the ambient light, allowing more ambient light to be detected.

In the embodiment shown in FIG. 10A, the wireless sensor module includes a plurality of light detectors 1007 of the same type. The use of a plurality of light detectors instead of a single light detector having a much larger detection area may ensure a faster response time while achieving the same level of output. In the embodiment shown in FIG. 10B, the wireless sensor module includes a plurality of first light detectors 1007*a* and a plurality of second light detectors 1007*b*. The first light detectors 1007*a* and the second light detectors 1007*b* and arranged in an alternating manner. The first light detectors 1007*a* and the second light detectors 1007*b* may be of different types and/or made from different materials. For example, the first light detectors 1007*a* and the second light detectors 1007*b* may have different spectral responses so that the combination of the first light detectors 1007*a* and the second light detectors 1007*b* can capture a wider bandwidth of light. The numbers, types, and arrangement of the light detectors are not limited to the embodiments shown in FIGS. 10A and 10B and could be decided depending on the environment in which the wireless sensor is intended to operate and the purpose of the data to be collected by the particular light detector.

Figure 11:
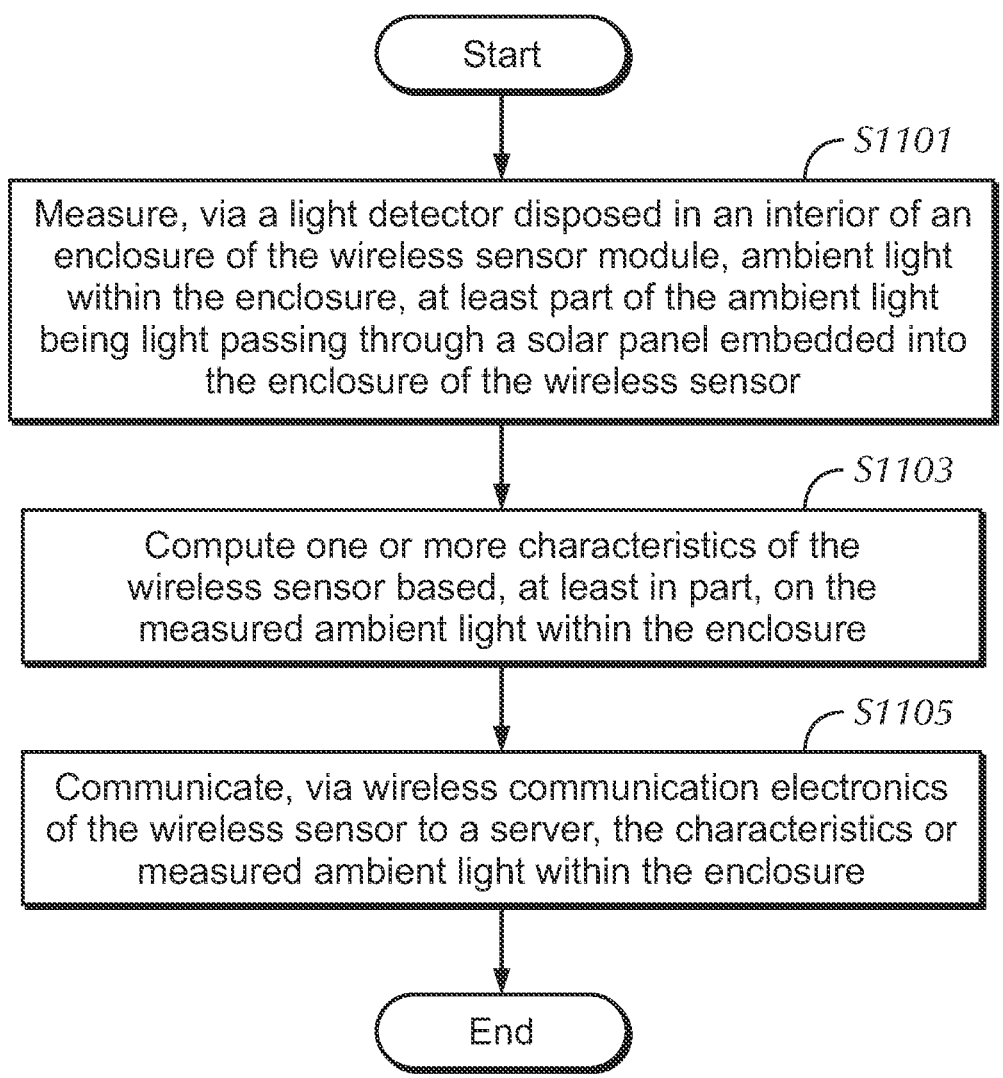
FIG. 11 shows a flow chart describing a method for monitoring a wireless sensor module in accordance with one or more embodiments.

FIG. 11 shows a flow chart describing a method for monitoring a wireless sensor module in accordance with one or more embodiments. In Step 1101, ambient light within an interior of an enclosure of the wireless sensor is measured via a light detector disposed in the interior. At least part of the ambient light is light passing through a solar panel embedded into the enclosure of the wireless sensor module. In Step 1103, the wireless sensor firmware computes one or more characteristics of the wireless sensor based, at least in part, on the measured ambient light within the enclosure. In Step 1105, the measured ambient light and one or more of the characteristics if needed, are communicated, via wireless communication electronics of the wireless sensor module, to a server.

In one or more embodiments, a state of charge of a battery of the wireless sensor module charged by a solar panel of the wireless sensor module is further measured. The state of charge measurement may be comprised of either the present voltage of the battery or the rate of current inflow from the solar panel. The measured state of charge of the battery is communicated to the server. The one or more characteristics of the wireless sensor module is computed further based on the measured state of charge of the battery.

In one or more embodiments, the one or more characteristics of the wireless sensor module comprise at least one of a conversion efficiency of the solar panel, a charging time of a battery charged by a solar panel of the wireless sensor module, and a lifetime of the battery.

In one or more embodiments, the computed conversion efficiency of the solar panel is compared with a threshold level. The threshold value is a value of the conversion efficiency of the solar panel below which the solar panel can no longer generate enough power for the normal operation of the wireless sensor module. In response to determining that the conversion efficiency of the solar panel is lower than the threshold value, the wireless sensor may send a warning message to the server, which will the notify a user that the conversion efficiency of the solar panel is lower than the threshold value. For example, the notification may be performed through a graphical user interface displayed on a computer or mobile device of the user.

In one or more embodiments, the user may be notified in a similar manner of a need of service, maintenance, or replacement of a component (e.g., the solar panel or the battery) of the wireless sensor or the entire wireless sensor.

In one or more embodiments, firmware in the wireless sensor can use the ambient light data, battery state of charge, and additional measurements if needed to calculate a predicted remaining operating time of the wireless sensor based on the net projected charge decline rate. This predictive maintenance information can be an important result of this invention.

In one or more embodiments, once the ambient light data is collected, it can be used to determine optimal operating conditions for the wireless sensor. Such conditions may include: re-positioning or re-orienting the sensor, battery conditioning, and other data mining aspects such as combining the ambient light data with temperature, humidity, etc. to determine optimal operating conditions for the sensors. As an example, by combining the ambient light data with the amount of energy created by the solar panel and the charge of the rechargeable battery in the wireless sensor, the user can maximize the efficiency of the wireless sensor. If there is "too much" incident light on the solar panel during the day and the battery is always fully charged during the day, the user may be notified to re-position or re-orient the solar panel so that less energy is made during the day so that there is a more even charge/discharge of the battery (optimal battery conditioning). If the battery never fully charges even when the incident light is at its maximum or throughout the daytime, then the user may be notified to re-position or re-orient the sensor should so that more light may be incident on the solar panel. If the amount of incident light is steady but the amount of energy generated by the solar panel decreases, then the solar panel efficiency may be decreasing and the user may be notified accordingly.

In one or more embodiments, the power produced (solar power output) by the PV panel is obtained by subtracting the power used by the electronic devices from the power stored in the battery. The solar power output of the PV panel is directly related (linear relationship) to the light flux measurement integrated over time and calibration can be determined by initial measurements. The power used by the electronics can be calculated based on the power used by the transmitter (e.g., local wireless, cellular or satellite transceiver circuitry) which is typically comprising more than 90% of the total power budget, the power spent during the sensing intervals which are typically short and involve much lower power draw than the transmitter circuit or module requirements, and the sleeping current of the wireless sensor unit which typically has the smallest power draw. To estimate the overall system power use, initial measurements of average transceiver power, sensing power and sleeping power can be made. Then during operation, the system microprocessor continually measures the time spent on each component, and by multiplying the calculated power draw by elapsed time it can create a running system power budget of the system electronics.

Figure 12:
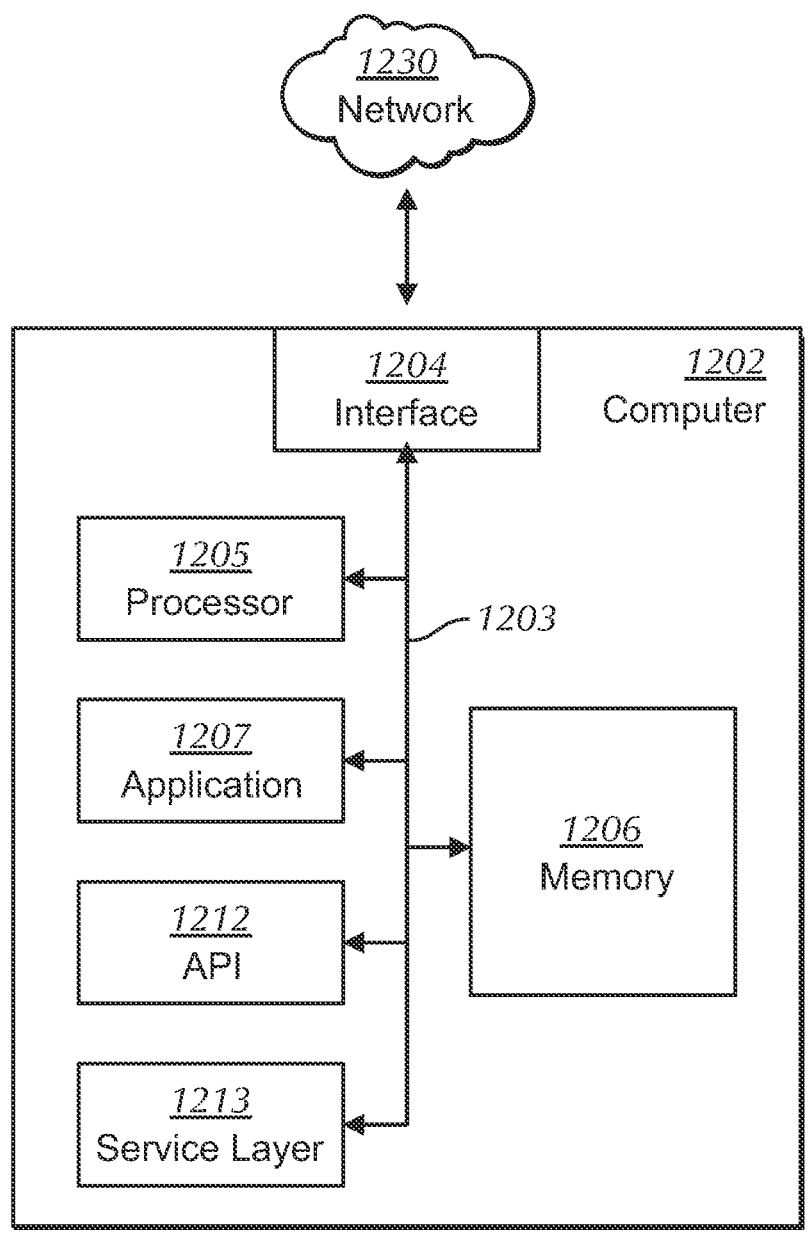
FIG. 12 shows a computer system in accordance with one or more embodiments.

Embodiments may be implemented on a computer system. FIG. 12 is a block diagram of a computer system 1202 used to provide computational functionalities associated with described algorithms, methods, functions, processes, flows, and procedures as described in the instant disclosure, according to an implementation. The illustrated computer 1202 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 1202 may include a computer that includes an input device, such as a keypad, keyboard, touch screen, or other device that can accept user information, and an output device that conveys information associated with the operation of the computer 1202, including digital data, visual, or audio information (or a combination of information), or a GUI.

The computer 1202 can serve in a role as a client, network component, a server, a database or other persistency, or any other component (or a combination of roles) of a computer system for performing the subject matter described in the instant disclosure. The illustrated computer 1202 is communicably coupled with a network 1230. In some implementations, one or more components of the computer 1402 may be configured to operate within environments, including cloud-computing-based, local, global, or other environment (or a combination of environments).

At a high level, the computer 1202 is an electronic computing device operable to receive, transmit, process, store, or manage data and information associated with the described subject matter. According to some implementations, the computer 1202 may also include or be communicably coupled with an application server, e-mail server, web server, caching server, streaming data server, business intelligence (BI) server, or other server (or a combination of servers).

The computer 1202 can receive requests over network 1230 from a client application (for example, executing on another computer 1202 and responding to the received requests by processing the said requests in an appropriate software application. In addition, requests may also be sent to the computer 1202 from internal users (for example, from a command console or by other appropriate access method), external or third-parties, other automated applications, as well as any other appropriate entities, individuals, systems, or computers.

Each of the components of the computer 1202 can communicate using a system bus 1203. In some implementations, any or all of the components of the computer 1202, both hardware or software (or a combination of hardware and software), may interface with each other or the interface 1204 (or a combination of both) over the system bus 1203 using an application programming interface (API) 1212 or a service layer 1213 (or a combination of the API 1212 and service layer 1213. The API 1212 may include specifications for routines, data structures, and object classes. The API 1212 may be either computer-language independent or dependent and refer to a complete interface, a single function, or even a set of APIs. The service layer 1213 provides software services to the computer 1202 or other components (whether or not illustrated) that are communicably coupled to the computer 1202. The functionality of the computer 1202 may be accessible for all service consumers using this service layer. Software services, such as those provided by the service layer 1213, provide reusable, defined business functionalities through a defined interface. For example, the interface may be software written in JAVA, C++, or other suitable language providing data in extensible markup language (XML) format or other suitable format. While illustrated as an integrated component of the computer 1202, alternative implementations may illustrate the API 1212 or the service layer 1213 as stand-alone components in relation to other components of the computer 1202 or other components (whether or not illustrated) that are communicably coupled to the computer 1202. Moreover, any or all parts of the API 1212 or the service layer 1213 may be implemented as child or sub-modules of another software module, enterprise application, or hardware module without departing from the scope of this disclosure.

The computer 1202 includes an interface 1204. Although illustrated as a single interface 1204 in FIG. 12, two or more interfaces 1204 may be used according to particular needs, desires, or particular implementations of the computer 1202. The interface 1204 is used by the computer 1202 for communicating with other systems in a distributed environment that are connected to the network 1230. Generally, the interface 1204 includes logic encoded in software or hardware (or a combination of software and hardware) and operable to communicate with the network 1230. More specifically, the interface 1204 may include software supporting one or more communication protocols associated with communications such that the network 1230 or interface's hardware is operable to communicate physical signals within and outside of the illustrated computer 1202.

The computer 1202 includes at least one computer processor 1205. Although illustrated as a single computer processor 1205 in FIG. 12, two or more processors may be used according to particular needs, desires, or particular implementations of the computer 1202. Generally, the computer processor 1205 executes instructions and manipulates data to perform the operations of the computer 1202 and any algorithms, methods, functions, processes, flows, and procedures as described in the instant disclosure.

The computer 1202 also includes a memory 1206 that holds data for the computer 1202 or other components (or a combination of both) that can be connected to the network 1230. For example, memory 1206 can be a database storing data consistent with this disclosure. Although illustrated as a single memory 1206 in FIG. 12, two or more memories may be used according to particular needs, desires, or particular implementations of the computer 1202 and the described functionality. While memory 1206 is illustrated as an integral component of the computer 1202, in alternative implementations, memory 1206 can be external to the computer 1202. In one or more embodiments, the memory 1206 may volatile, i.e., memory that requires power to maintain stored information, or non-volatile, i.e., memory capable of retaining stored information even after power is removed, or a combination of both.

The application 1207 is an algorithmic software engine providing functionality according to particular needs, desires, or particular implementations of the computer 1202, particularly with respect to functionality described in this disclosure. For example, application 1207 can serve as one or more components, modules, applications, etc. Further, although illustrated as a single application 1207, the application 1207 may be implemented as multiple applications 1207 on the computer 1202. In addition, although illustrated as integral to the computer 1202, in alternative implementations, the application 1207 can be external to the computer 1202.

There may be any number of computers 1202 associated with, or external to, a computer system containing computer 1202, each computer 1202 communicating over network 1230. Further, the term "client," "user," and other appropriate terminology may be used interchangeably as appropriate without departing from the scope of this disclosure. Moreover, this disclosure contemplates that many users may use one computer 1202, or that one user may use multiple computers 1202. Embodiments of the methods disclosed herein may be implemented on virtually any type of computer regardless of the platform being used and may be software instructions stored on a non-transitory computer-readable medium that causes a computer to perform the methods.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A wireless sensor for remote stationary asset monitoring, comprising:
   an enclosure that houses sensor electronics and wireless communication electronics;
   a solar panel embedded into the enclosure such that the solar panel forms or is a portion of a first wall of the enclosure, wherein the solar panel is configured to:
      absorb a first portion of light incident on the solar panel and
      generate electrical power, based on the absorbed first portion of light, for charging a battery of the wireless sensor and/or powering the sensor electronics and the wireless communication electronics; and
   a light detector disposed within an interior of the enclosure,
      wherein the light detector is configured to measure ambient light, within the enclosure, and
      wherein the ambient light comprises of a second portion of the light incident on the solar panel that passes through the solar panel.

2. The wireless sensor according to claim 1, wherein the wireless sensor communicates, via the wireless communication electronics, the measured ambient light within the enclosure.

3. The wireless sensor according to claim 1, wherein the wireless sensor communicates, via the wireless communication electronics, one or more characteristics of the wireless sensor based, at least in part, on the measured ambient light within the enclosure.

4. The wireless sensor according to claim 1, further comprising a plurality of light detectors.

5. The wireless sensor according to claim 4,
   wherein the plurality of light detectors comprises a plurality of first light detectors and a plurality of second light detectors, and
   wherein the plurality of first light detectors and the plurality of second light detectors have different spectral responses.

6. The wireless sensor according to claim 1, wherein the light detector is disposed underneath the solar panel.

7. The wireless sensor according to claim 1, wherein a bandgap of a material of the light detector is smaller than a bandgap of a material of the solar panel.

8. The wireless sensor according to claim 1, wherein the light detector is disposed on a second wall of the enclosure opposing the first wall of the enclosure.

9. The wireless sensor according to claim 1, wherein the light detector is disposed on a main processor circuit board.

10. The wireless sensor according to claim 1, further comprising a partition disposed in the interior of the enclosure,
    wherein the sensor electronics and the wireless communication electronics are disposed on a second wall of the enclosure opposing the first wall of the enclosure,
    wherein the partition is disposed between the first wall of the enclosure and the second wall of the enclosure, and
    wherein the light detector is disposed on the partition.

11. The wireless sensor according to claim 1, wherein an inner surface of the enclosure is lined with a reflective coating.

12. A method for monitoring a wireless sensor, comprising:

housing sensor electronics and wireless communication electronics within an enclosure of the wireless sensor:

embedding a solar panel into the enclosure such that the solar panel forms or is a portion of a first wall of the enclosure;

absorbing, by the solar panel, a first portion of light incident on the solar panel;

generating electrical power from the absorbed first portion of light to charge a battery of the wireless sensor and/or power the sensor electronics and the wireless communication electronics:

disposing a light detector within an interior of the enclosure:

measuring, by the light detector, ambient light within the enclosure, wherein the ambient light consists of a second portion of the light incident on the solar panel that passes through the solar panel; and communicating, via the wireless communication electronics to a server, the measured ambient light.

13. The method according to claim 12, further comprising:

computing one or more characteristics of the wireless sensor based, at least in part, on the measured ambient light.

14. The method according to claim 13, further comprising:

measuring a state of charge of a battery of the wireless sensor charged by the solar panel, and communicating the measured state of charge of the battery to the server, wherein computing the one or more characteristics is further based on the measured state of charge of the battery.

15. The method according to claim 13, wherein the one or more characteristics comprise at least one of a conversion efficiency of the solar panel, a charging time of a battery charged by the solar panel, an estimated projected remaining operation time based on a discharge rate of the battery, or an estimated projected lifetime of the battery.

16. The method according to claim 14, further comprising adjusting by a power used by the sensor electronics and the wireless communication electronics.

17. The method according to claim 15, further comprising:

determining that the conversion efficiency of the solar panel is lower than a threshold value; and in response to determining that the conversion efficiency of the solar panel is lower than the threshold value, notifying a user that the conversion efficiency of the solar panel is lower than the threshold value.

18. The method according to claim 12, wherein the light detector is disposed underneath the solar panel.

19. The method according to claim 1, wherein the enclosure is optically-scaled such that the ambient light within the enclosure consists only of the second portion of the light incident on the solar panel that passes through the solar panel solar panel.

20. The method according to claim 12, wherein the enclosure is optically-sealed such that the ambient light within the enclosure consists only of the second portion of the light incident on the solar panel that passes through the solar panel solar panel.

* * * * *